United States Patent
Turner et al.

(10) Patent No.: US 10,623,217 B1
(45) Date of Patent: Apr. 14, 2020

(54) PROPORTIONAL AC-COUPLED EDGE-BOOSTING TRANSMIT EQUALIZATION FOR MULTI-LEVEL PULSE-AMPLITUDE MODULATED SIGNALING

(71) Applicant: NVIDIA Corp., Santa Clara, CA (US)

(72) Inventors: Walker Turner, Raleigh, NC (US); William James Dally, Incline Village, NV (US)

(73) Assignee: NVIDIA Corp., Santa Clara, CA (US)

( * ) Notice: Subject to any disclaimer, the term of this patent is extended or adjusted under 35 U.S.C. 154(b) by 0 days.

(21) Appl. No.: 16/424,745

(22) Filed: May 29, 2019

(51) Int. Cl.
- *H04L 27/01* (2006.01)
- *H04L 1/20* (2006.01)
- *H04L 7/04* (2006.01)
- *H04L 25/06* (2006.01)
- *H04L 25/03* (2006.01)

(52) U.S. Cl.
CPC .............. *H04L 27/01* (2013.01); *H04L 1/205* (2013.01); *H04L 7/041* (2013.01); *H04L 25/03006* (2013.01); *H04L 25/069* (2013.01)

(58) Field of Classification Search
CPC ......... H04L 27/01; H04L 1/205; H04L 7/041; H04L 25/03006; H04L 25/069
See application file for complete search history.

(56) References Cited

U.S. PATENT DOCUMENTS

| | | | |
|---|---|---|---|
| 6,133,858 A | 10/2000 | Karl et al. | |
| 7,269,212 B1* | 9/2007 | Chau | H04L 25/03878 326/80 |
| 2006/0112210 A1 | 5/2006 | Tseng | |
| 2008/0019460 A1 | 1/2008 | Giles et al. | |
| 2008/0152363 A1 | 6/2008 | Koc | |
| 2009/0310709 A1 | 12/2009 | Bare | |
| 2011/0311008 A1* | 12/2011 | Slezak | H03M 9/00 375/353 |
| 2013/0094561 A1* | 4/2013 | Raphaeli | H04L 25/03057 375/233 |
| 2013/0128943 A1 | 5/2013 | Doron et al. | |
| 2013/0195155 A1* | 8/2013 | Pan | H03D 1/00 375/219 |
| 2014/0169429 A1 | 6/2014 | Ran | |
| 2016/0080090 A1* | 3/2016 | Nagarajan | H04B 10/2575 398/79 |

OTHER PUBLICATIONS

Farjad, et al, "An Equalization Scheme for IOGbs 4-PAM Signaling over Long Cables" 1997. (Year: 1997).*

* cited by examiner

*Primary Examiner* — Jaison Joseph
(74) *Attorney, Agent, or Firm* — Rowan TELS LLC (57) ABSTRACT

A PAM signaling system utilizes multiple equalizers on each data lane of a serial data bus, each of the equalizers associated with a different signal eye of the serial data bus.

18 Claims, 12 Drawing Sheets

| Input Data | | 4-PAM Eye | EQ Control Logic |
|---|---|---|---|
| MSB | LSB | | |
| 1 | 1 | Eye 3 | MSB & LSB |
| 1 | 0 | Eye 2 | MSB |
| 0 | 1 | Eye 1 | MSB \|\| LSB |
| 0 | 0 | | |

FIG. 10

| Input Data | | | 8-PAM Eye | EQ Control Logic |
|---|---|---|---|---|
| MSB | ISB | LSB | | |
| 1 | 1 | 1 | Eye 7 | MSB · ISB · LSB |
| 1 | 1 | 0 | Eye 6 | MSB · ISB |
| 1 | 0 | 1 | Eye 5 | MSB · (ISB + LSB) |
| 1 | 0 | 0 | Eye 4 | MSB |
| 0 | 1 | 1 | Eye 3 | ISB · LSB + MSB |
| 0 | 1 | 0 | Eye 2 | MSB + ISB |
| 0 | 0 | 1 | Eye 1 | MSB + ISB + LSB |
| 0 | 0 | 0 | | |

PROPORTIONAL AC-COUPLED EDGE-BOOSTING TRANSMIT EQUALIZATION FOR MULTI-LEVEL PULSE-AMPLITUDE MODULATED SIGNALING

BACKGROUND

In high-performance computing systems the memory system and the linking structures, i.e. the data buses, over which components communicate, may to a large extent determine the computing capacity of the system. An important performance feature of data buses is the rate at which data signals are transmitted over the data buses between various components. The maximum transmission rate derives from the bus clock frequency, the number of bus clocks per data transfer, and the number of bits transmitted per transfer period. An increase in system performance may therefore be achieved by increasing the bus clock frequency, increasing the number of bits transmitted in each clock interval, or by an increase of the bus width.

It is increasingly important with faster and more complex computing systems that the individual system components and devices are capable of communicating safely and reliably at ever higher frequencies and over increasingly wider data buses.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
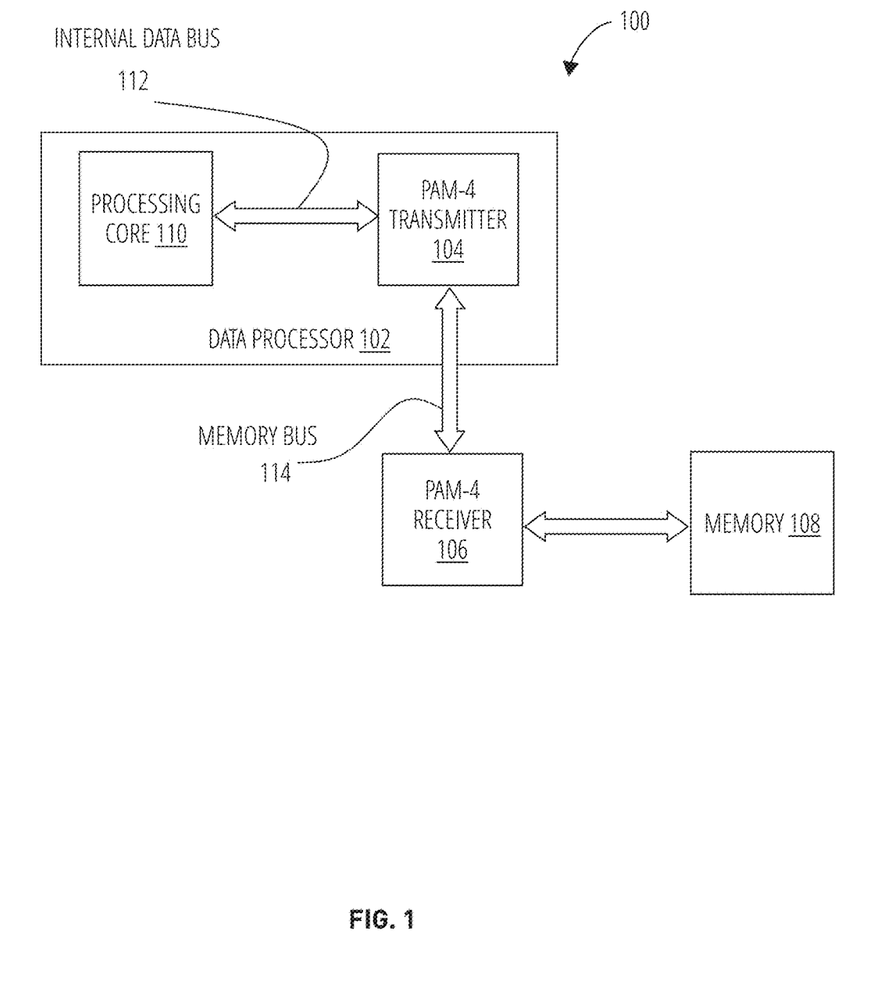
FIG. 1 illustrates a data communication system 100 in accordance with one embodiment.

Referring to FIG. 1, a data communication system 100 comprises a transmitting device such as a data processor 102 that includes a processing core 110 and a pulse-amplitude modulated (PAM) transmitter (PAM-4 transmitter 104). The data processor 102 may in some embodiments comprise a graphics processing unit (GPU), a central processing unit (CPU), a system on a chip (SoC), or other well-known data processing devices.

The data processor 102 communicates with a receiving device such as a memory 108 over a bus such as a memory bus 114. A PAM-4 receiver 106 receives PAM-4 signals communicated by the PAM-4 transmitter 104 over the memory bus 114 and communicates the data to the memory 108.

The data processor 102 utilizes an internal data bus 112 to transmit data bursts to and from the processing core 110 over a multi-lane internal data bus 112. The PAM-4 transmitter 104 receives a burst of data from the processing core 110 and transmits the burst as PAM-4 symbols to the PAM-4 receiver 106 via the memory bus 114. The PAM-4 receiver 106 receives the symbols and sends them as data to the memory 108.

This is a simplified diagram. In practice, there may be additional elements such as data encoders and decoders on both ends of the memory bus 114.

Figure 2:
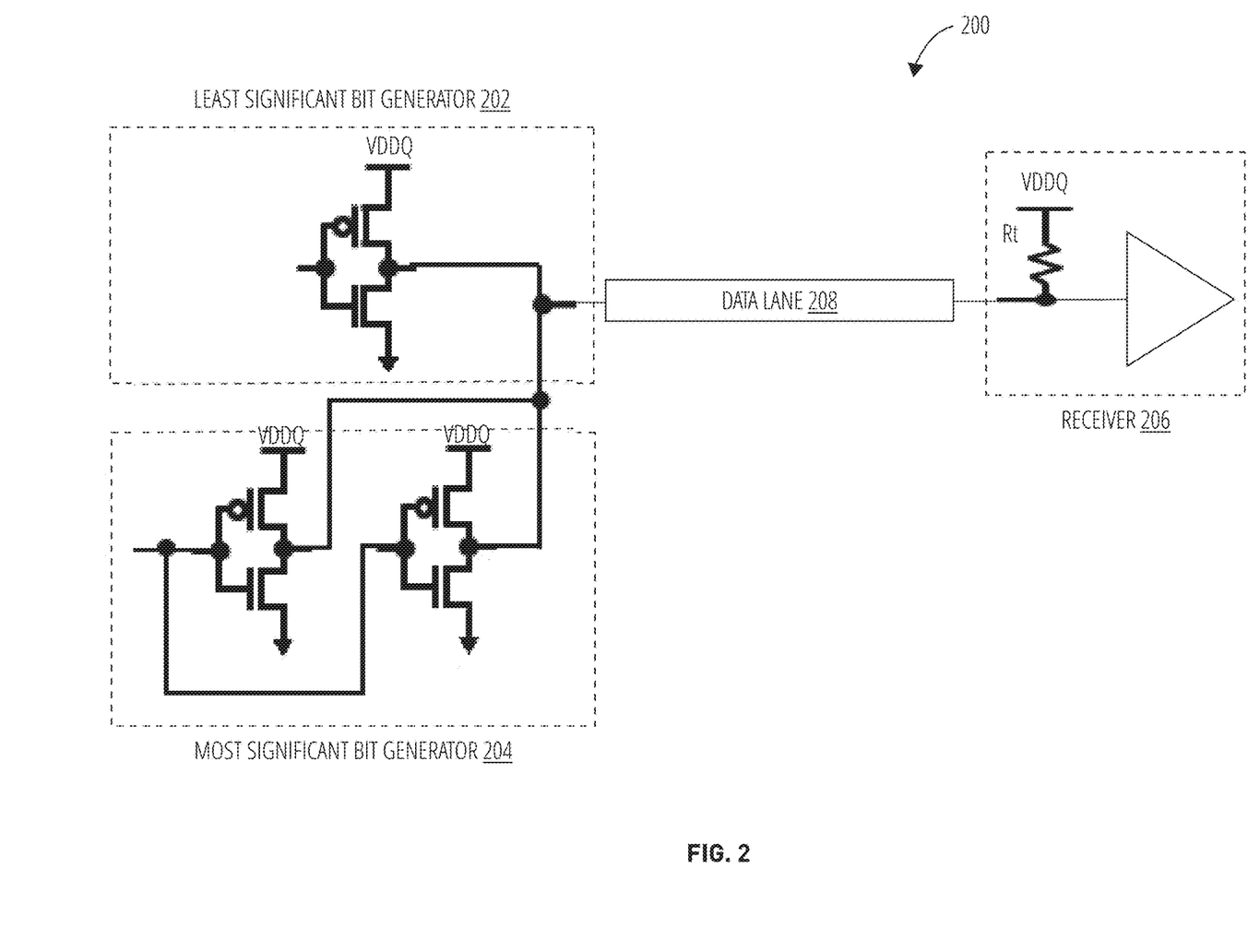
FIG. 2 illustrates an embodiment of a PAM-4 serial link 200.

FIG. 2 illustrates a PAM-4 serial link 200 for a single data lane of a serial data bus in one embodiment. The PAM-4 serial link 200 comprises a least significant bit transmitter 202, a most significant bit transmitter 204, a receiver 206, and a data lane 208. The PAM-4 serial link 200 utilizes the least significant bit transmitter 202 and the most significant bit transmitter 204 to generate a four-level symbol on the data lane 208. Herein the term "symbol" refers to a voltage level generated by a line driver on a serial data bus data lane, where the voltage level represents the value of one or more bits of data. Thus "encoding a symbol" means physically configuring a line driver circuit of the serial data bus to drive the voltage on the data lane to a particular value.

For example, if the two-bits of data to encode into the symbol are (1,1), the outputs of the least significant bit transmitter 202 and most significant bit transmitter 204 combine to generate a voltage of, e.g., 1.2 V on the data lane 208 and current on the data lane 208 is, e.g., 0 mA due to the pull-up transistor Rt at the receiver 206 (both ends of the data lane 208 are at the same potential). If the two-bits of data to encode into the symbol are (1,0), the outputs of the least significant bit transmitter 202 and most significant bit transmitter 204 combine to generate a voltage of, e.g., 1.0 V on the data lane 208 and current on the data lane 208 is, e.g., 5 mA. If the two-bits of data to encode into the symbol are (0,1), the outputs of the least significant bit transmitter 202 and most significant bit transmitter 204 combine to generate a voltage of, e.g., 0.8 V on the data lane 208 and current on the data lane 208 is, e.g., 10 mA. If the two-bits of data to encode into the symbol are (0,0), the outputs of the least significant bit transmitter 202 and most significant bit transmitter 204 combine to generate a voltage of, e.g., 0.6 V on the data lane 208 and current on the data lane 208 is, e.g., 15 mA. The 0.6V may be referred to herein as the base transmission voltage $V_b$ from which the other symbol voltage levels are delta-ed. The symbol value on a data lane therefore corresponds to the current consumption of that data lane during a data burst.

Figure 3:
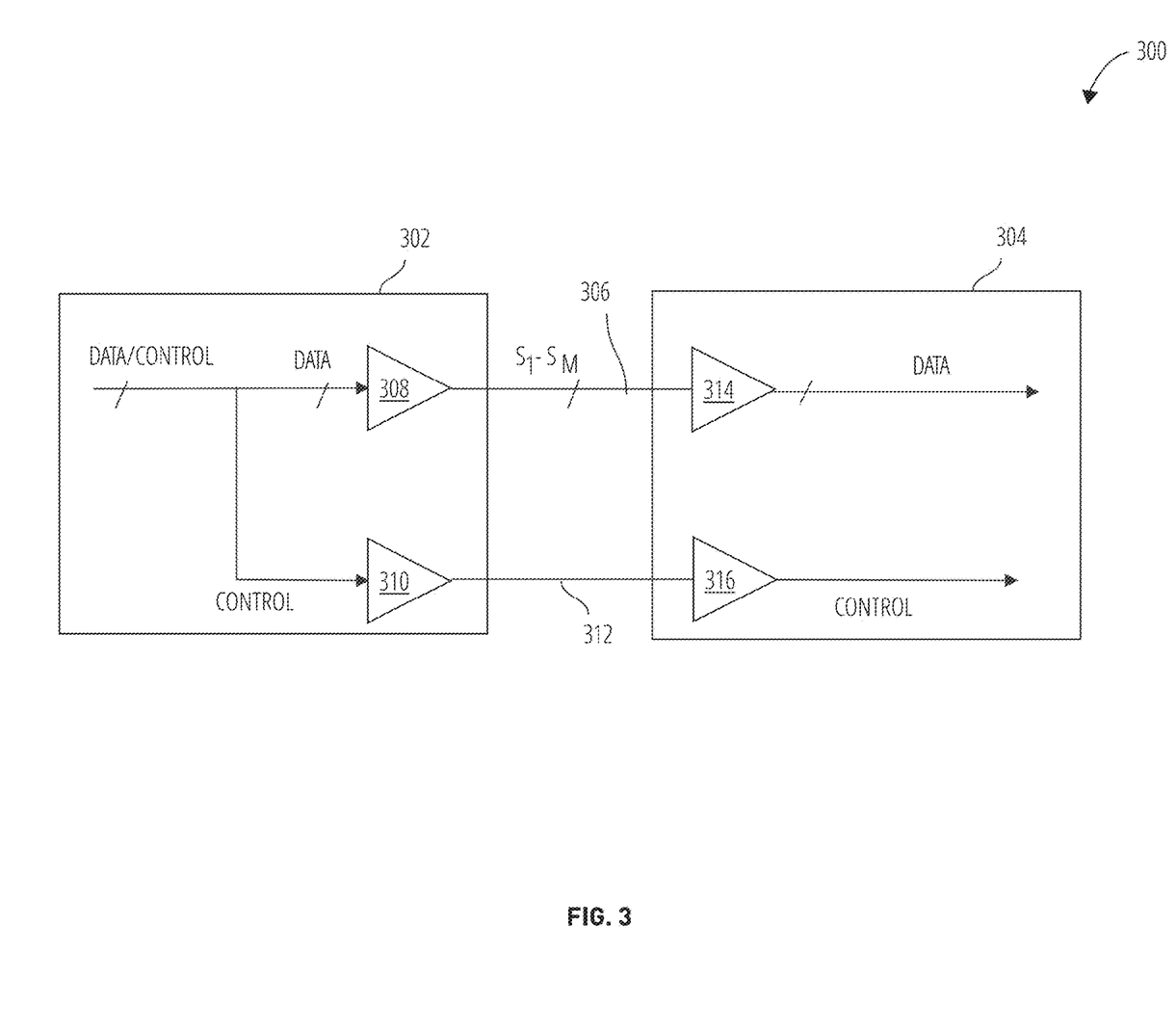
FIG. 3 illustrates an embodiment of a PAM transmitter/receiver arrangement 300.
Figure 4:
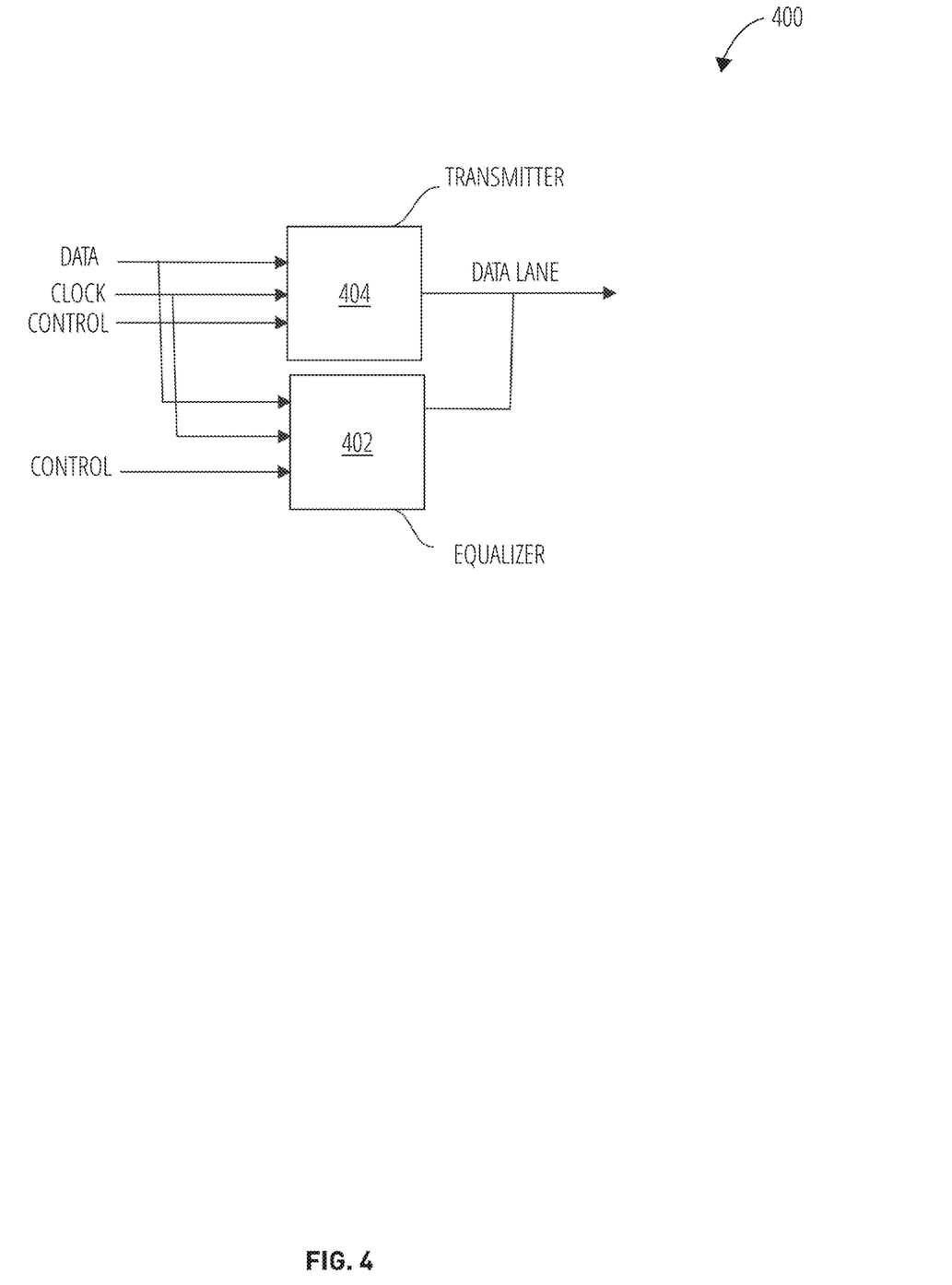
FIG. 4 illustrates an auxiliary A/C-coupled edge boosted signaling system 400 in accordance with one embodiment.

FIG. 3 illustrates a transmitter/receiver arrangement 300 in one embodiment. A transmitter device 302 and a receiver device 304 communicate over a multi-lane serial data bus 306 having a predetermined width (number of data lanes) represented by M. The line drivers 308 of the transmitter device 302 encode PAM symbols S1-SM in parallel on the M data lanes of the multi-lane serial data bus 306. The data word to be transmitted over the multi-lane serial data bus 306 comprises a plurality of P bits. If N is the number of discrete voltage levels used in the PAM encoding, e.g., N=4 for PAM-4, then a number of bits equal to log 2(N) are encoded by each symbol on each data lane of the multi-lane serial data bus 306.

In embodiments utilizing data encoders and decoders, the transmitter device 302 may also include a control line driver 310 to communicate control information about the symbols on the data lanes on an additional control line 312 to the receiver device 304. The receiver device 304 comprises termination circuits 314 on the input side connected to the multi-lane serial data bus 306 in order to receive the symbols transmitted on the multi-lane serial data bus 306, wherein one of the termination circuits 314 is typically provided for every data lane. The receiver device 304 further includes an additional termination circuit 316, which is provided in order to receive the control information transmitted on the control line 312. The received symbols represent bit combinations of length log 2(N) (e.g., S1=00, S2=01, and so on for PAM-4).

A data eye is the interval of the communication clock cycle in which signal values transmitted over the data bus are stable, and a device receiving the data can successfully resolve the signals at its inputs. The form, height, and width of the data eye therefore represent the transmission quality visually, showing how data signals transmitted over the data bus may be resolved at the receiver device.

The vertical height and horizontal width of the signal eye at the receiver may be narrowed due to inter-symbol interference (ISI), which results from bandwidth limitations of the data bus and the transmit and receive circuitry. A combination of the equivalent drive resistance, channel impedances, and parasitic effects on both ends of the bus cause frequency-dependent signal loss, which results in data-dependent ISI. The resulting signal eye can narrow significantly, for example to a width of around 2 ns, even though the bus clock interval is 5 ns. Thus even though the transmitter has (in this example) a 5 ns window in which to communicate each symbol on the data lane, the receiver only has 2 ns to resolve the symbol due to narrowing of the signal eye caused by frequency-dependent losses within the overall link. In some cases the resulting signal eye may disappear completely, so that no reliable signal transmission between two electronic devices over the serial data bus is possible.

This problem is exacerbated with PAM-N(N>2) signaling because of the additional (>2) voltage levels utilized by symbols within the overall signal range. For example in PAM-4 each signal eye is ⅓ of the overall signal voltage range, so signal eye closure effects consume a larger percentage of the voltage range within each PAM-4 voltage band. For higher-order (e.g., PAM-8) communication techniques the effects may be even greater.

Embodiments of the equalization scheme disclosed herein operate in parallel with the line drivers to inject energy onto the data lanes at high frequencies. This scheme effectively extends the frequency response of the received signal to reduce ISI. The signal is equalized while maintaining an impedance match to the channel without reducing the direct current (DC) amplitude of the signal. Embodiments of a multi-level PAM equalizer to remediate signal eye closure are described by example in FIG. 4 through FIG. 11.

Figure 5:
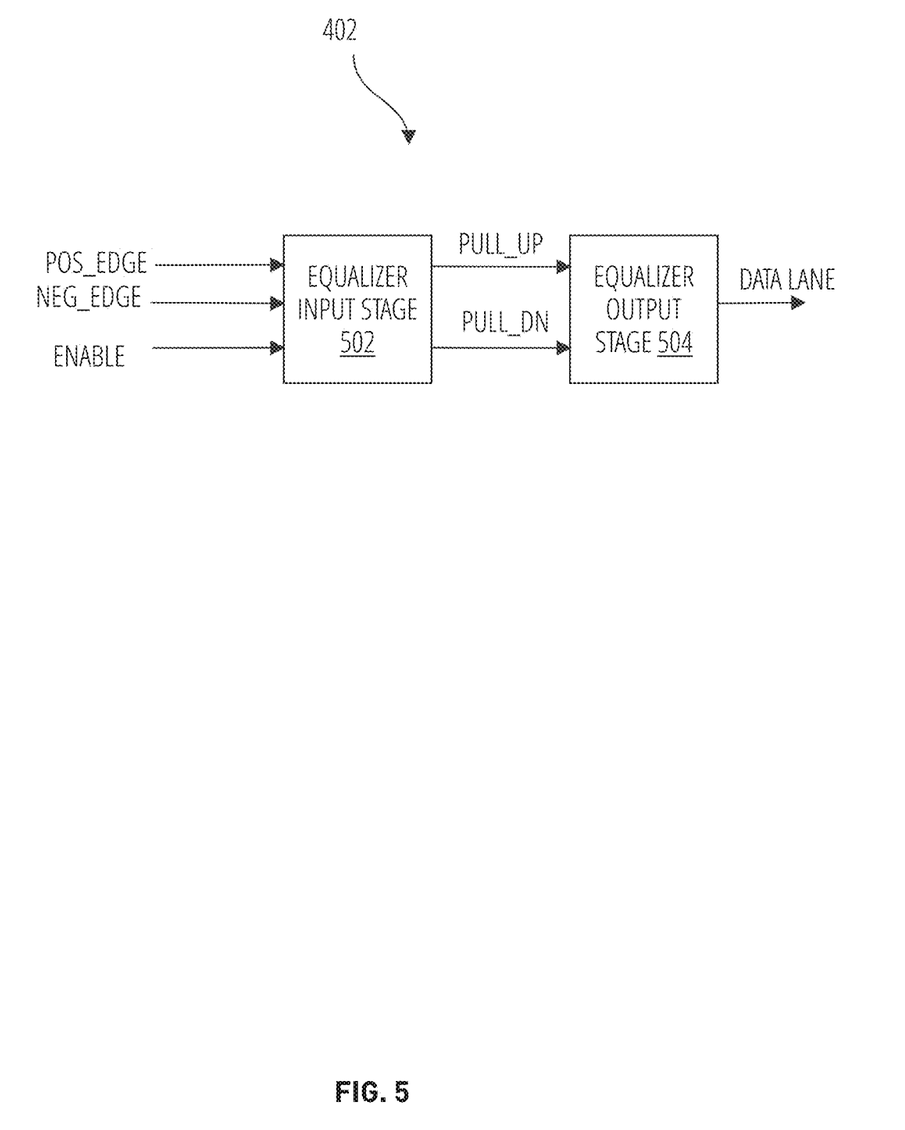
FIG. 5 illustrates an equalizer 402 in accordance with one embodiment.
Figure 6:
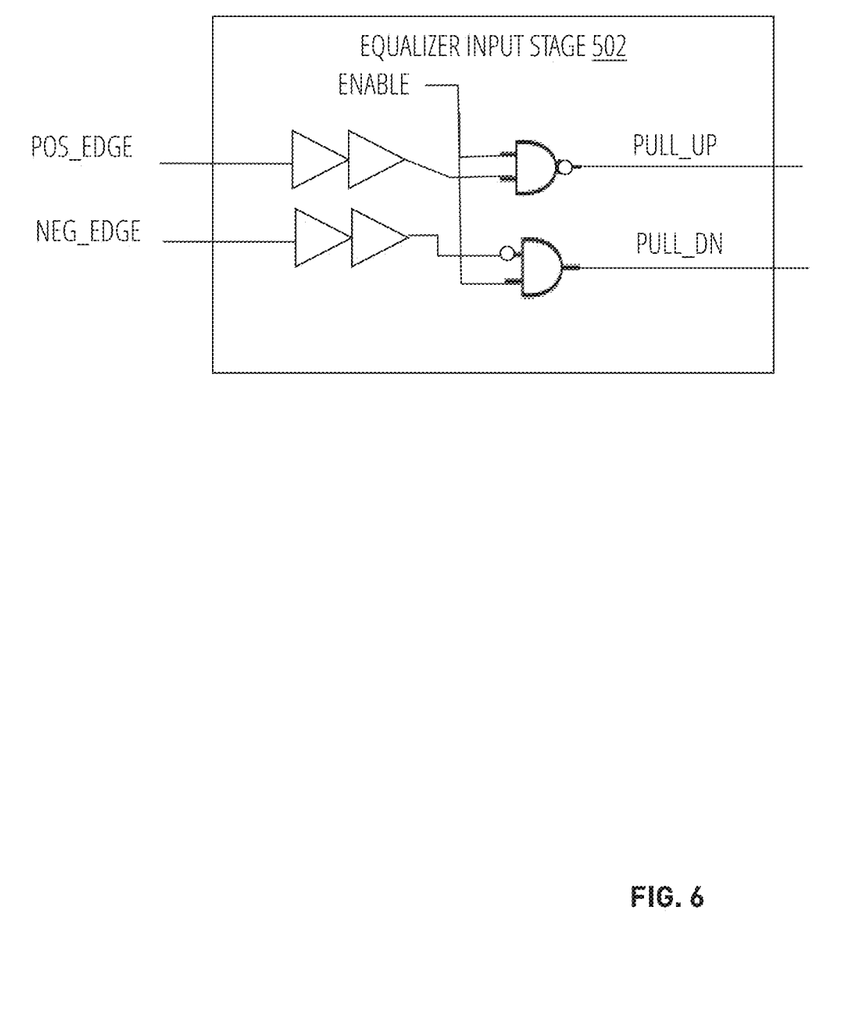
FIG. 6 illustrates an equalizer input stage 502 in accordance with one embodiment.
Figure 7:
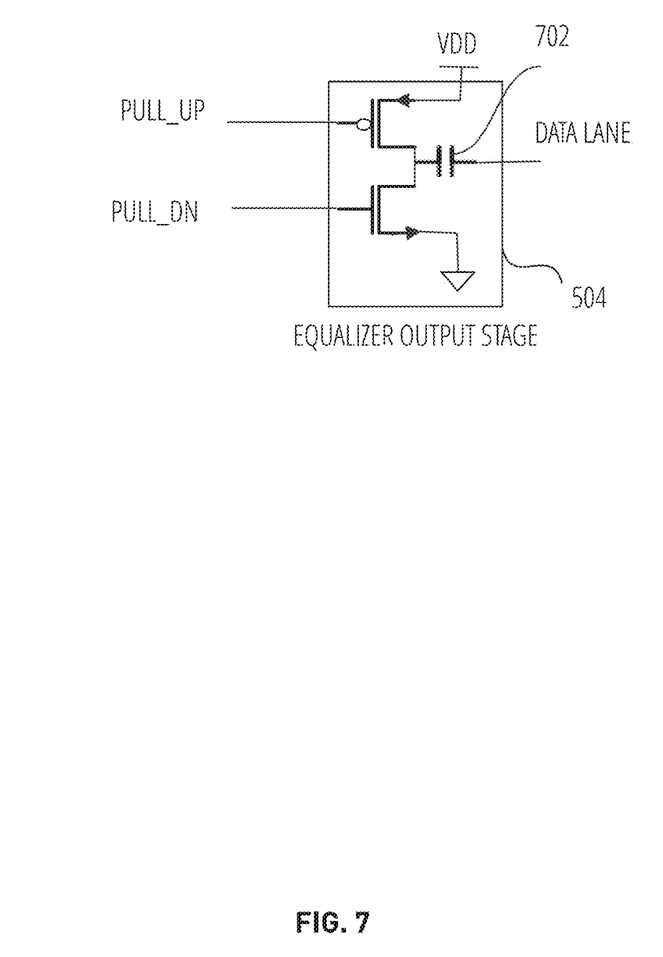
FIG. 7 illustrates an equalizer output stage 504 in accordance with one embodiment.
Figure 8:
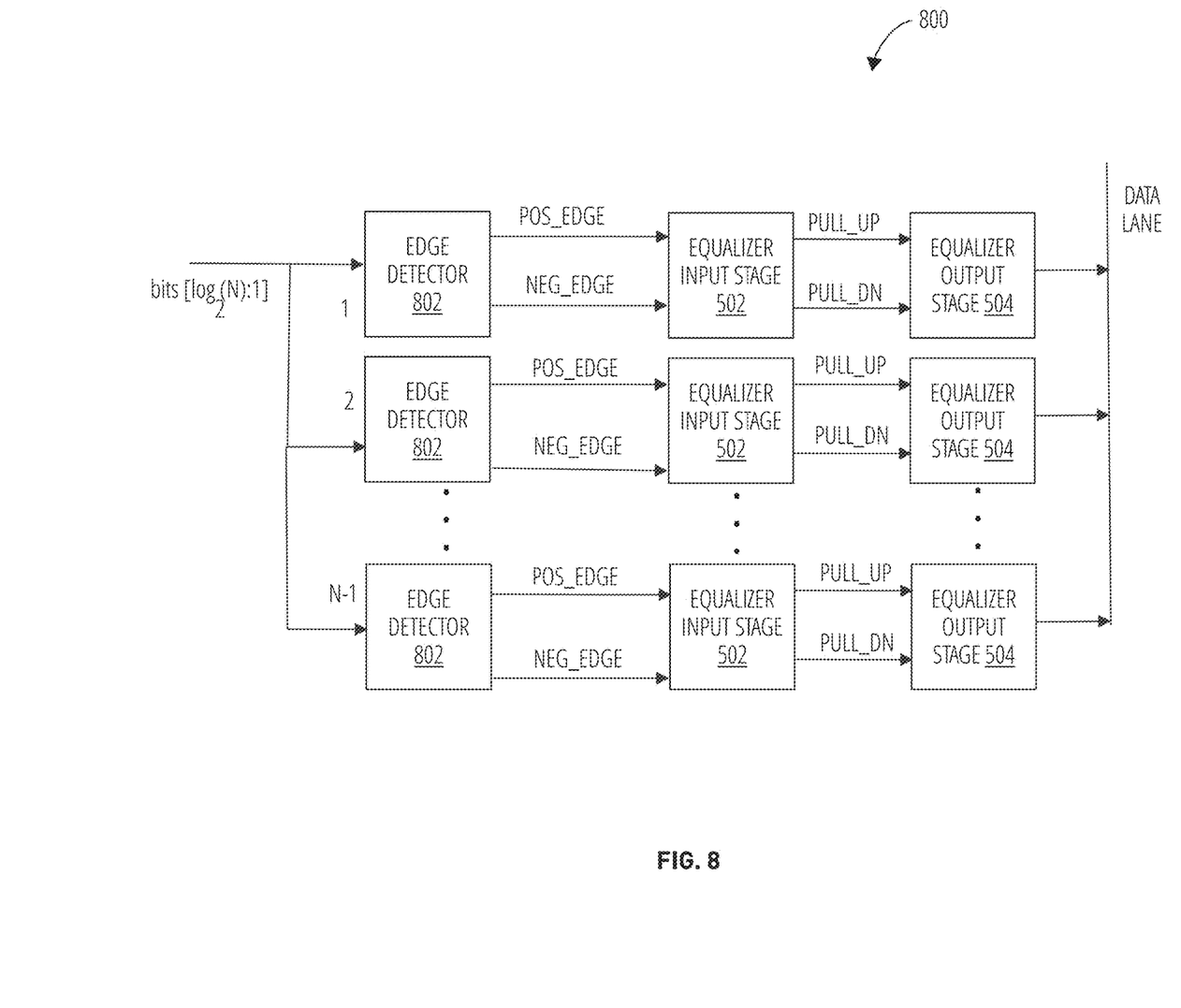
FIG. 8 illustrates a multi-level PAM equalizer 800 in accordance with one embodiment.
Figure 9:
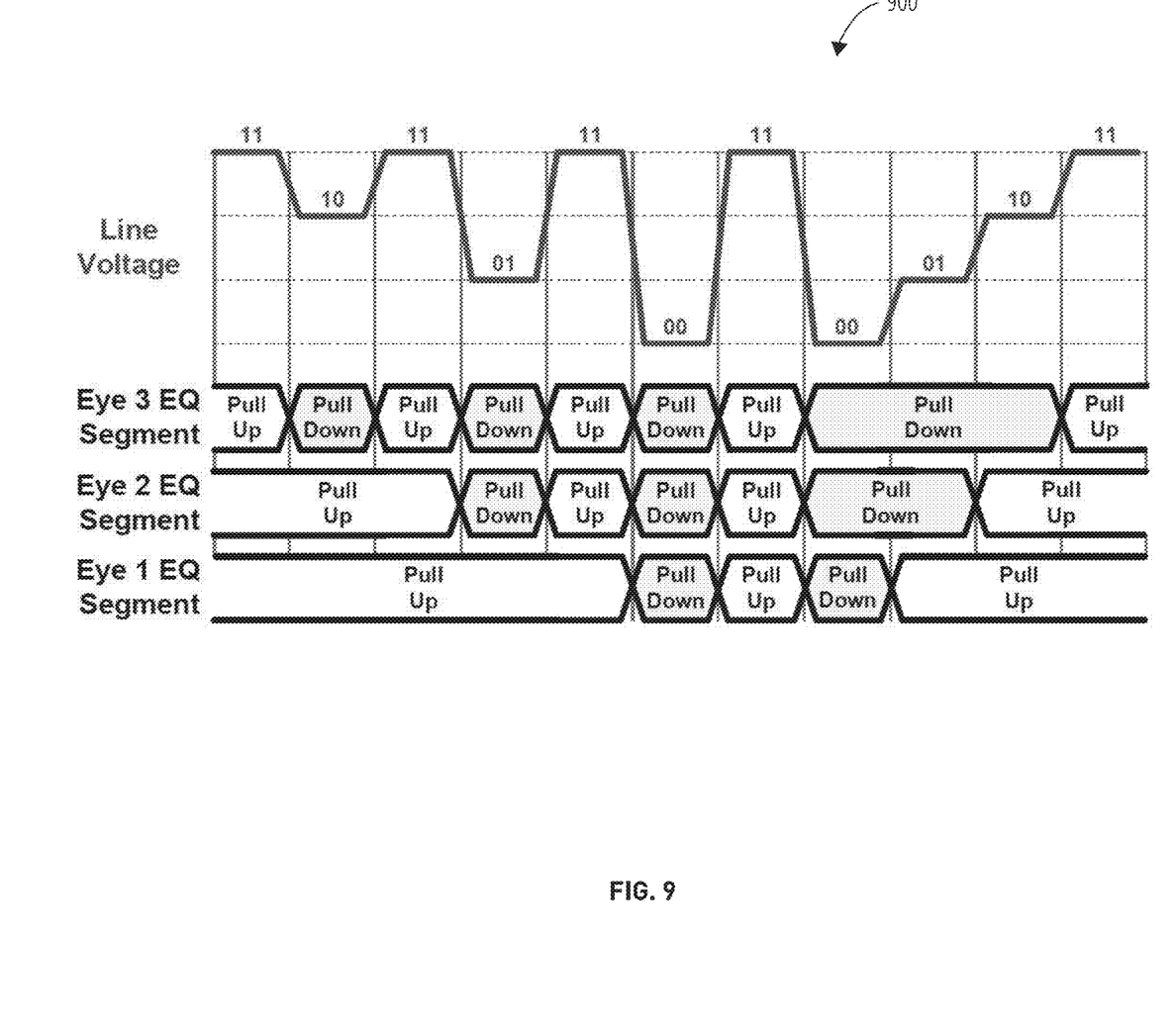
FIG. 9 illustrates a signal diagram 900 in accordance with one embodiment.

Referring now to FIG. 4 through FIG. 11, an auxiliary A/C-coupled edge boosted signaling system 400 in one embodiment comprises a 'non-return to zero' (NRZ) transmitter 404 and an NRZ equalizer 402. The equalizer 402 comprises equalizer input stage 502 and equalizer output stage 504, as illustrated in FIG. 5, FIG. 6, and FIG. 7, converting bits of data for transmission over the data lane into current injected into or pulled from the data lane. These may be combined with an edge detector 802 to form a multi-level PAM equalizer 800 in one embodiment, as illustrated in FIG. 8, wherein the edge detection may receive bits to transmit on the data lane, the input stage may respond to positive and negative edge outputs of the edge detection, and an output state may be coupled to the data lane. A signal diagram 900 for the multi-level PAM equalizer 800, where N=4, is illustrated in FIG. 9 for an exemplary series of symbols transmitted on a particular data lane. The multi-level PAM equalizer 800 may operate according to the PAM-4 control logic structure 1000 embodiment of FIG. 10, the PAM-8 control logic structure 1100 embodiment of FIG. 11, where N=8, or other embodiments of control logic depending on the number of pulse-amplitude modulation levels N.

The edge detector 802 may detect transitions of the signal eyes using NAND, NOR, or other common combinational gates. For PAM-4 each edge detector 802 monitors for changes (corresponding to positive or negative edges) in one or both of the most-significant and least-significant data bits (MSB and LSB respectively). An 8-PAM equalization scheme changes logic states based on the most, intermediate, and least significant input data bits (MSB, ISB, and LSB respectively). Similar truth tables may be readily generated by those of ordinary skill in the art for multi-level PAM signaling schemes with different numbers of voltage levels.

In the multi-level PAM equalizer 800 each edge detector 802 receives the multi-bit input data for a symbol and an optional clock and control signals. To equalize a PAM signaling scheme with N number of levels to encode $\log_2(N)$ bits, the multi-level PAM equalizer 800 utilizes N−1 equalization components that may be similarly sized, where each equalizer is associated with a specific PAM signal eye. The pull-up and pull-down control signals for each of the equalization components are generated by an associated edge detector 802, which performs edge-detection for each of the PAM signal eyes in the digital domain. When the symbol on a data lane changes state, the edge detector 802 toggles the pull-up and pull-down signals of the equalizer components associated with signal eyes traversed by the data lane signal. This enables independent control of the equalizer components, where the number of components toggled simultaneously in a given transmission interval is in proportion to the number of PAM voltage levels being transitioned in the interval, and thus results in a proportional amount of charge being injected into the line. The multi-level edge-detection/control logic may be implemented using a variety of methods including CMOS combinational logic, a thermometer encoder, or a look-up memory control structure such as a table.

The signal diagram 900 illustrates example waveforms for the transmitted data lane voltage and equalizer outputs for a PAM-4 signaling scheme. The outputs of each of the equalizers (there are N−1=3 per data lane) transition to either a pull-up or pull-down state based on changes to the multi-bit input data, which results in the polarity and number of equalizer components that toggle states to be in proportion to the number of PAM voltage levels transitioned in a given transmission interval. For example, when transitioning from 11→10, the equalizer component responsible for equalizing the top signal eye (Eye 3 EQ Segment) toggles from a pull-up to pull-down state to inject a negative amount of charge into the line and boost the negative transitioning output signal edge. When transitioning from 00→11, all equalizer components toggle from a pull-down to pull-up state in order to inject a positive amount of charge into the line that is three times larger than for the single-level-transition example. By allocating a specific same-sized equalizer for each PAM signal eye, each individual equalizer operates in the correct logic state with respect to the output signal. The inboard node of the coupling capacitor 702 is always pulled to the proper supply rail (VDD or GND) to ensure effective equalization strength on the next signal transition, irrespective of the current logic state.

Figure 10:
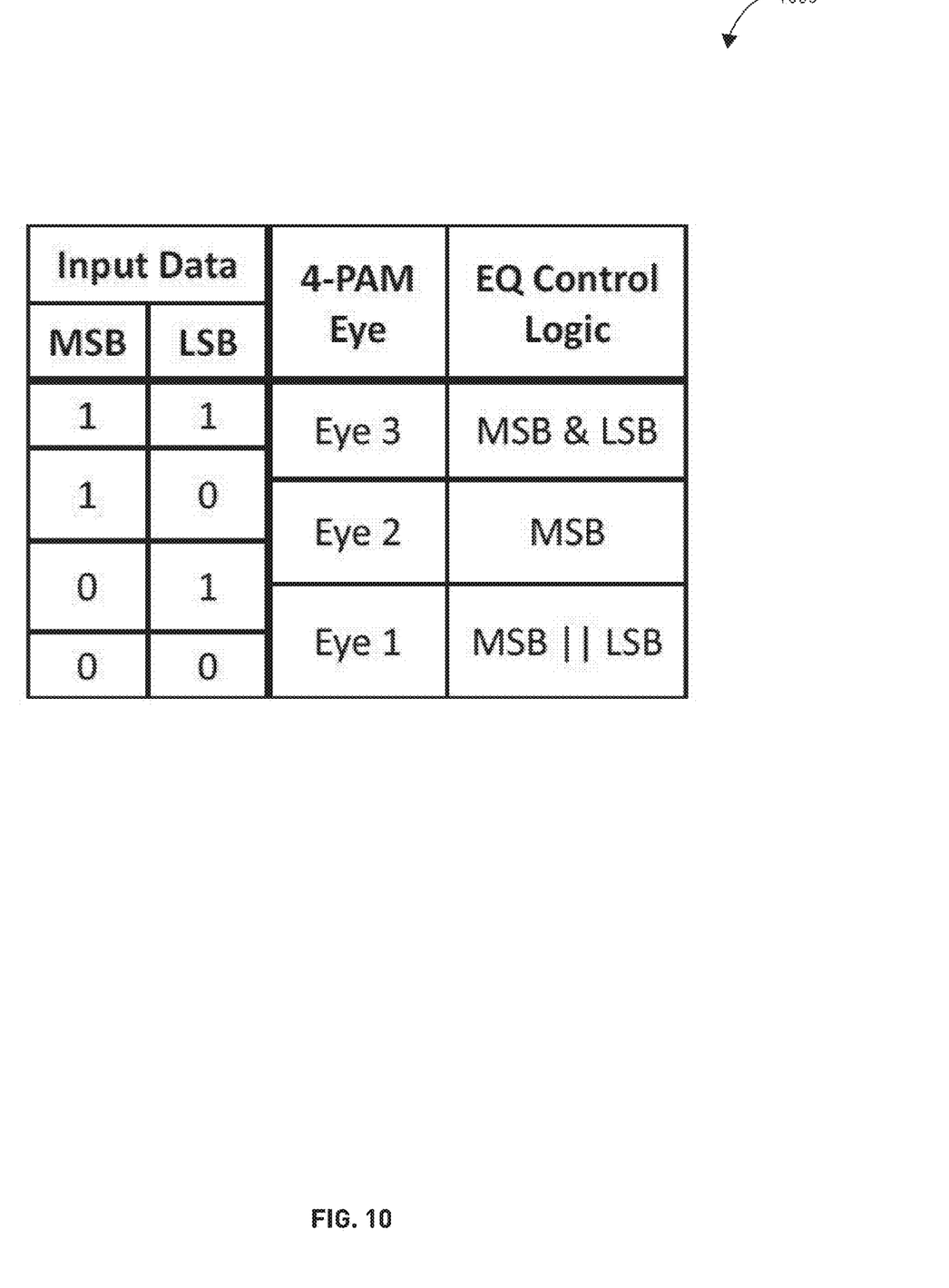
FIG. 10 illustrates a PAM-4 control logic structure 1000 in accordance with one embodiment.
Figure 11:
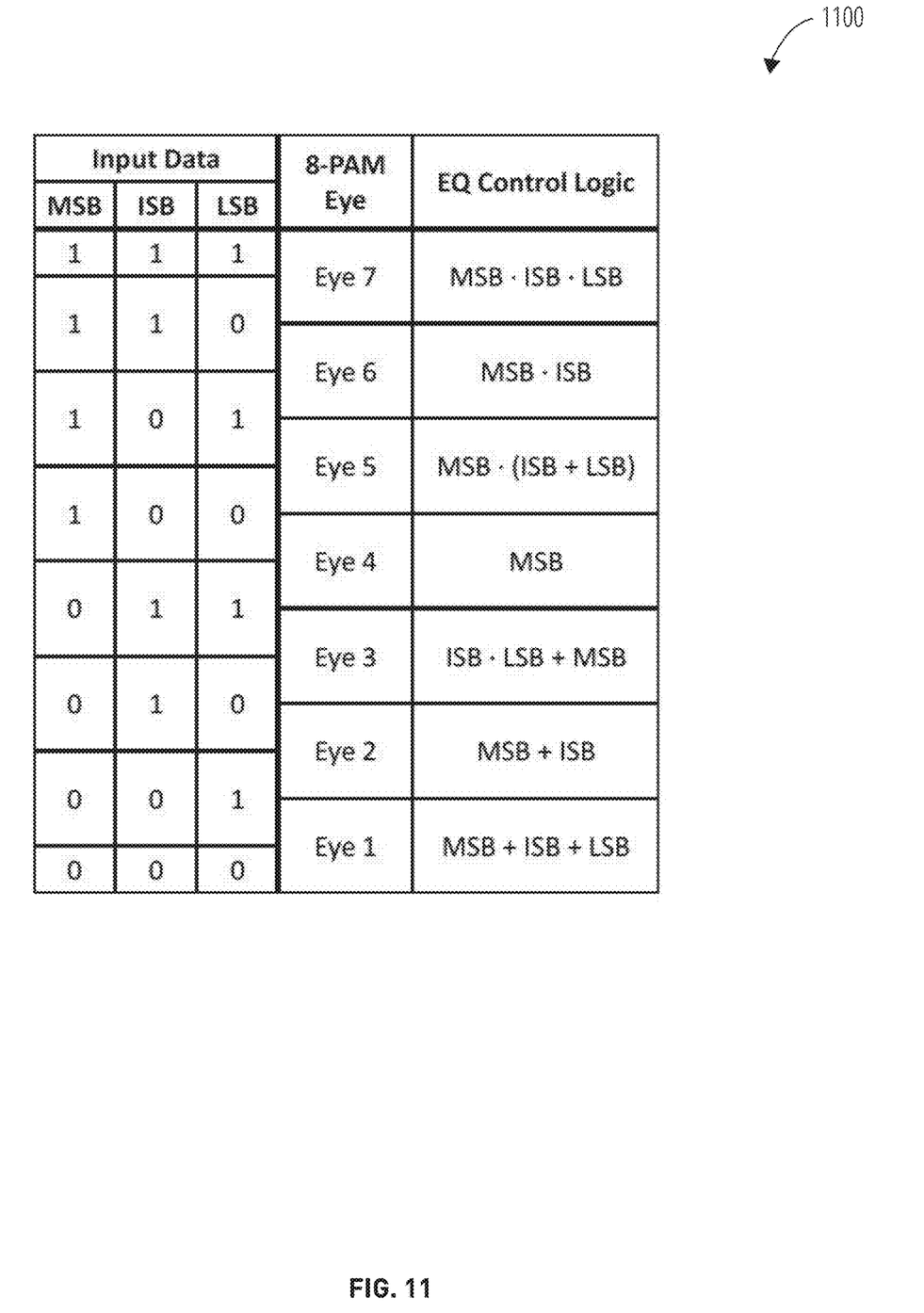
FIG. 11 illustrates a PAM-8 control logic structure 1100 in accordance with one embodiment.

Referring to FIG. 10, a PAM-4 control logic structure 1000 configures a first equalizer to perform a logical AND of a most significant bit and a least significant bit of each of the PAM-4 symbols, a second equalizer to passing the most significant bit of each of the symbols, and a third equalizer to perform a logical OR of the most significant bit and the least significant bit of each of the symbols. FIG. 11 depicts an exemplary PAM-8 control logic structure 1100 for PAM-8.

Figure 12:
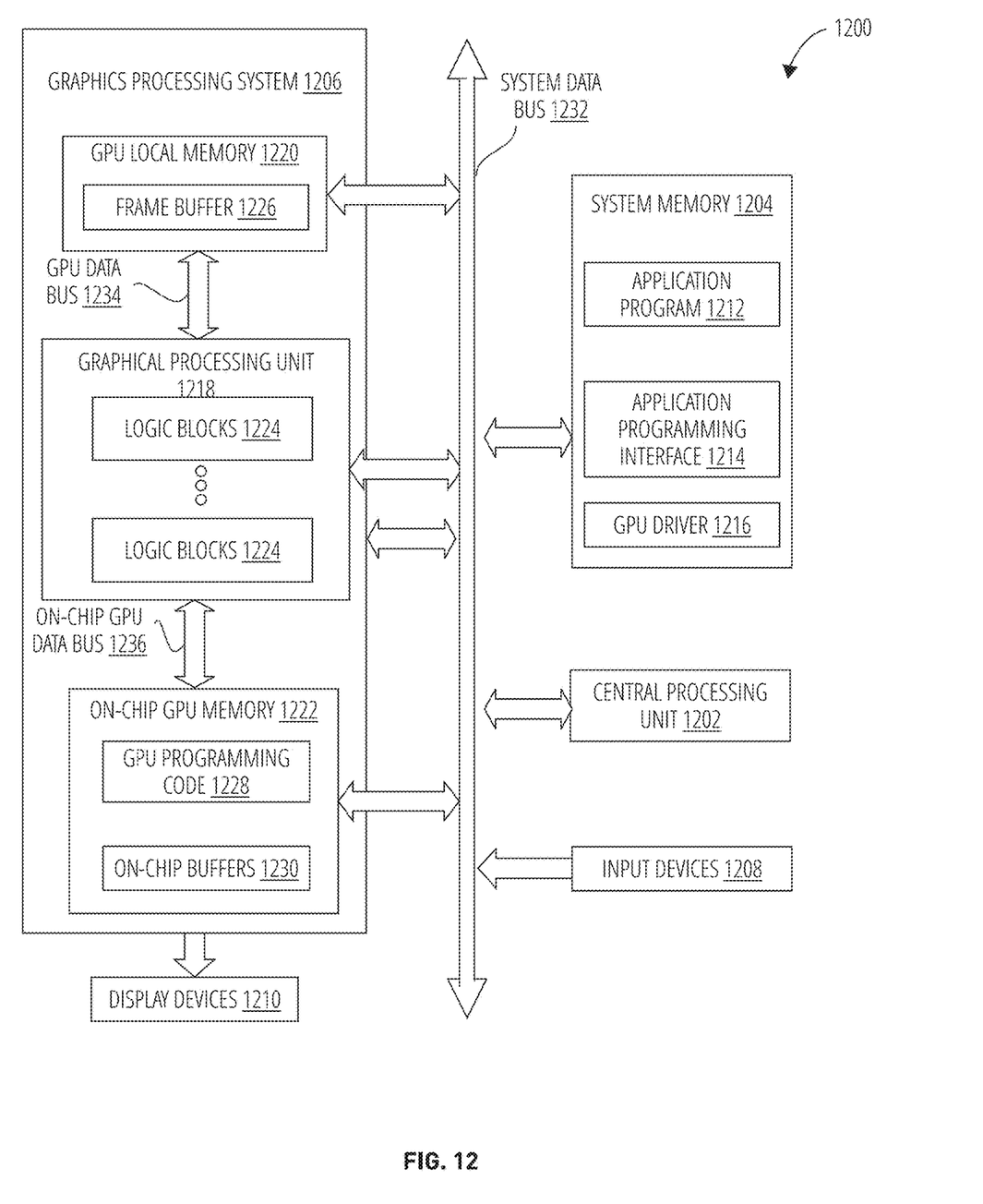
FIG. 12 is a block diagram of a computing system 1200 within which the PAM communication embodiments introduced herein may be embodied or carried out.

FIG. 12 is a block diagram of one embodiment of a computing system 1200 in which one or more aspects of the disclosure may be implemented. The computing system 1200 includes a system data bus 1232, a CPU 1202, input devices 1208, a system memory 1204, a graphics processing system 1206, and display devices 1210. In alternate embodiments, the CPU 1202, portions of the graphics processing system 1206, the system data bus 1232, or any combination thereof, may be integrated into a single processing unit. Further, the functionality of the graphics processing system 1206 may be included in a chipset or in some other type of special purpose processing unit or co-processor.

As shown, the system data bus 1232 connects the CPU 1202, the input devices 1208, the system memory 1204, and the graphics processing system 1206. In alternate embodiments, the system memory 1204 may connect directly to the CPU 1202. The CPU 1202 receives user input from the input devices 1208, executes programming instructions stored in the system memory 1204, operates on data stored in the system memory 1204 to perform computational tasks. The system memory 1204 typically includes dynamic random access memory (DRAM) employed to store programming instructions and data. The graphics processing system 1206 receives instructions transmitted by the CPU 1202 and processes the instructions, for example to implement aspects of the disclosed embodiments, and/or to render and display graphics (e.g., images, tiles, video) on the display devices 1210.

As also shown, the system memory 1204 includes an application program 1212, an API 1214 (application programming interface), and a graphics processing unit driver 1216 (GPU driver). The application program 1212 generates calls to the API 1214 to produce a desired set of computational results. For example, the application program 1212 may transmit programs or functions thereof to the API 1214 for processing within the graphics processing unit driver 1216.

The graphics processing system 1206 includes a GPU 1218 (graphics processing unit), an on-chip GPU memory 1222, an on-chip GPU data bus 1236, a GPU local memory 1220, and a GPU data bus 1234. The GPU 1218 is configured to communicate with the on-chip GPU memory 1222 via the on-chip GPU data bus 1236 and with the GPU local memory 1220 via the GPU data bus 1234. The GPU 1218 may receive instructions transmitted by the CPU 1202, process the instructions, and store results in the GPU local memory 1220. Subsequently, the GPU 1218 may display certain graphics stored in the GPU local memory 1220 on the display devices 1210.

The GPU 1218 includes one or more logic blocks 1224. The logic blocks 1224 may implement embodiments of the systems and techniques disclosed herein. For example, the logic blocks 1224 may implement aspects of the encoding or decoding techniques disclosed herein for improving the signal eyes on serial data buses.

The GPU 1218 may be provided with any amount of on-chip GPU memory 1222 and GPU local memory 1220, including none, and may employ on-chip GPU memory 1222, GPU local memory 1220, and system memory 1204 in any combination for memory operations.

The on-chip GPU memory 1222 is configured to include GPU programming 1228 and on-Chip Buffers 1230. The GPU programming 1228 may be transmitted from the graphics processing unit driver 1216 to the on-chip GPU memory 1222 via the system data bus 1232. The GPU programming 1228 may include the logic blocks 1224.

The GPU local memory 1220 typically includes less expensive off-chip dynamic random access memory (DRAM) and is also employed to store data and programming employed by the GPU 1218. As shown, the GPU local memory 1220 includes a frame buffer 1226. The frame buffer 1226 may for example store data for example an image, e.g., a graphics surface, that may be employed to drive the display devices 1210. The frame buffer 1226 may include more than one surface so that the GPU 1218 can render one surface while a second surface is employed to drive the display devices 1210.

The display devices 1210 are one or more output devices capable of emitting a visual image corresponding to an input data signal. For example, a display device may be built using a liquid crystal display, or any other suitable display system. The input data signals to the display devices 1210 are typically generated by scanning out the contents of one or more frames of image data that is stored in the frame buffer 1226.

The disclosed embodiments may be utilized in many ways in the computing system 1200, for example for data transmission over the GPU data bus 1234, the on-chip GPU data bus 1236, the system data bus 1232, and/or any of the busses to or from any computing element (e.g., GPU 1218, CPU 1202) and another computing element, system memory 1204, or a peripheral device.

The disclosed aspects may be utilized in conjunction with any one or more of the busses of the computing system 1200.

The embodiments described in this document may be expanded for use in other multi-level PAM signaling schemes that utilize different numbers of voltage levels. These embodiments may also be adapted for use in differential links with equalizer components that operate on complimentary versions of the multi-bit input data. The embodiments may also be adapted for operating off high-supply voltages utilizing level shifters and cascoding transistors within the equalizer output stage to ensure circuit voltage compliance.

Embodiments of the disclosed equalization scheme may be applied with other line driver topologies other than the examples used herein. The equalization scheme is auxiliary to and operates in parallel with the primary line drivers.

The specific voltages, amperages, and other details described above are for illustrative purposes only. The invention may be practiced using a variety of specific voltage levels, currents, resistances, and so forth. And while the invention has been described above in the context of e.g. a processor transmitting data to a memory, the PAM-4 etc. signaling techniques described herein may be practiced in any of a wide variety of signaling systems in which data is sent from a transmitting device to a receiving device, or between transceiving devices, and so forth.

Terms used herein should be accorded their ordinary meaning in the relevant arts, or the meaning indicated by their use in context, but if an express definition is provided, that meaning controls.

"Logic" herein refers to machine memory circuits, non-transitory machine-readable media, and/or circuitry that by way of its material and/or material-energy configuration comprises control and/or procedural signals, and/or settings and values (such as resistance, impedance, capacitance, inductance, current/voltage ratings, etc.), that may be applied to influence the operation of a device. Electronic circuits such as controllers, field programmable gate arrays, processors, and memory (both volatile and nonvolatile) comprising processor-executable instructions are examples of logic. Logic specifically excludes pure signals or software per se (however does not exclude machine memories comprising software and thereby forming configurations of matter).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will appreciate that logic may be distributed throughout one or more devices or components, and/or may comprise combinations of memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A signaling system comprising:
   a pulse amplitude modulated (PAM) transmitter coupled to a data lane of a bus, the transmitter configured to generate N>2 discrete voltage levels on the data lane;
   a plurality of N−1 equalizers coupled to the data lane, each of the plurality of N−1 equalizers associated with a different signal eye of the data lane; and
   wherein each equalizer comprises:
   a control and edge detection stage to receive bits to transmit on the data lane;
   an output stage coupled to the data lane; and
   an input stage to respond to a positive edge output and a negative edge output from the control and edge detection stage with a pull-up output and a pull-down output to the output stage.

2. The signaling system of claim 1, each of the plurality of N−1 equalizers having a same size.

3. The signaling system of claim 1, each equalizer converting log 2(N) bits of data for transmission over the data lane into current injected on the data lane or pulled from the data lane.

4. The signaling system of claim 1, the transmitter comprising a PAM-4 transmitter and N=4.

5. The signaling system of claim 4, wherein a first equalizer performs a logical AND of a most significant bit and a least significant bit of a symbol for the data lane, wherein a second equalizer passes the most significant bit of the symbol, and wherein a third equalizer performs a logical OR of the most significant bit and the least significant bit of the symbol.

6. The signaling system of claim 1, the transmitter is a PAM-8 transmitter and N=8.

7. A signaling system comprising:
a serial data bus comprising a plurality of data lanes;
each of the data lanes coupled to a line driver in parallel with a plurality of N−1 equalizers of equal size, where N>2 pulse amplitude modulation levels are generated by the line driver; and
wherein each of the equalizers comprises:
a control and edge detection stage to receive bits to transmit on the data lanes;
an output stage coupled to the data lanes; and
an input stage to respond to a positive edge output and a negative edge output from the control and edge detection stage with a pull-up output and a pull-down output to the output stage.

8. The signaling system of claim 7, each equalizer associated with a signal eye for a different one of the N>2 pulse amplitude modulation levels.

9. The signaling system of claim 7, each of the equalizers converting log 2(N) bits into a pull-up output and a pull-down output for the data lane.

10. The signaling system of claim 9, each of the equalizers converting the log 2(N) bits of data into current injected on the data lane or pulled from the data lane.

11. The signaling system of claim 7 wherein N=4.

12. The signaling system of claim 7 wherein N=8.

13. A method comprising:
operating a line driver to encode a plurality of $\log_2(N)$ bits into one of N>2 symbols on a data lane of a serial data bus;
applying the plurality of log 2(N) bits to each of a plurality of N−1 equalizers coupled to the data lane in parallel with the line driver, each of the plurality of N−1 equalizers associated with a different signal eye of the symbols; and
each of the plurality of N−1 equalizers converting the plurality of log 2(N) bits to a positive edge output boost or a negative edge output boost of the symbols.

14. The method of claim 13, each of the equalizers having a same size.

15. The method of claim 13, each equalizer converting the plurality of bits into current injected on the data lane or pulled from the data lane.

16. The method of claim 13, further comprising a first equalizer of the plurality of N−1 equalizers performing a logical AND of a most significant bit and a least significant bit of each of the symbols, a second equalizer of the plurality of N−1 equalizers passing the most significant bit of each of the symbols, and a third equalizer of the plurality of N−1 equalizers performing a logical OR of the most significant bit and the least significant bit of each of the symbols.

17. The method of claim 13 wherein N=4.

18. The method of claim 13, wherein N=8.

* * * * *